US012633162B2

(12) United States Patent
Kolla et al.

(10) Patent No.: US 12,633,162 B2
(45) Date of Patent: May 19, 2026

(54) METHOD AND SYSTEM FOR IDENTITY VERIFICATION

(71) Applicant: HYPERVERGE INC., Irving, TX (US)

(72) Inventors: Manideep Kolla, Nellore (IN);
Aravinth Muthu, Ganapathy (IN);
Hariprasad P S, West Mambalam (IN);
Vignesh Krishnakumar, Chennai (IN)

(73) Assignee: HYPERVERGE INC., Irving, TX (US)

( * ) Notice: Subject to any disclaimer, the term of this patent is extended or adjusted under 35 U.S.C. 154(b) by 530 days.

(21) Appl. No.: 18/157,047

(22) Filed: Jan. 19, 2023

(65) Prior Publication Data

US 2024/0021016 A1    Jan. 18, 2024

Related U.S. Application Data

(60) Provisional application No. 63/389,150, filed on Jul. 14, 2022.

(51) Int. Cl.
| | |
|---|---|
| *G06V 40/16* | (2022.01) |
| *G06V 10/25* | (2022.01) |
| *G06V 30/41* | (2022.01) |
| *G06V 40/40* | (2022.01) |

(52) U.S. Cl.
CPC ............ *G06V 40/172* (2022.01); *G06V 10/25* (2022.01); *G06V 30/41* (2022.01); *G06V 40/45* (2022.01)

(58) Field of Classification Search
CPC ...... G06V 40/172; G06V 10/25; G06V 30/41; G06V 40/45
See application file for complete search history.

(56) References Cited

U.S. PATENT DOCUMENTS

| | | | |
|---|---|---|---|
| 2006/0204053 A1* | 9/2006 | Mori ..................... | G06F 18/213 |
| | | | 382/118 |
| 2015/0003733 A1* | 1/2015 | Wang .................. | G06V 30/416 |
| | | | 382/182 |
| 2015/0262333 A1* | 9/2015 | Chua .................... | G06V 40/172 |
| | | | 382/199 |
| 2018/0124046 A1* | 5/2018 | Verma ................. | G06F 16/5838 |
| 2019/0191078 A1* | 6/2019 | Nanaumi ............. | H04N 23/632 |
| 2020/0026944 A1* | 1/2020 | Uppal ................ | G06V 30/1463 |
| 2020/0242232 A1* | 7/2020 | Machani ............. | H04L 63/0884 |
| 2021/0064901 A1* | 3/2021 | Vorobiev ............... | G06V 40/45 |

(Continued)

*Primary Examiner* — David Perlman
(74) *Attorney, Agent, or Firm* — Ladas & Parry, LLP

(57) ABSTRACT

A system and method for authenticating an image is given. The method encompasses capturing a first image comprising at least one first human object and a second ID image; detecting at least one face of one first human object and processing the first human object based on face attribute checks, face quality checks, and face manipulation checks; performing a liveness check of the identification document to crop and align the region of interest; detecting a face of the at least one second human object; performing ID quality checks and ID tampering checks on the region of interest of the identification document; determining the image face feature vector and an ID card face feature vector; determining a match score between the image face feature vector and the ID card face feature vector and a status indicating one of authentication success, authentication failure, or a requirement for manual review of the image.

27 Claims, 3 Drawing Sheets

100

(56)          References Cited

U.S. PATENT DOCUMENTS

| | | | | |
|---|---|---|---|---|
| 2021/0124919 | A1* | 4/2021 | Balakrishnan | B42D 25/309 |
| 2021/0295017 | A1* | 9/2021 | Aoyagi | G06T 7/00 |
| 2022/0139143 | A1* | 5/2022 | Avitan | G06V 40/40 |
| | | | | 382/112 |
| 2022/0198459 | A1* | 6/2022 | Nazarkin | G06Q 20/204 |
| 2022/0309283 | A1* | 9/2022 | Orevi | G06V 40/193 |
| 2023/0109761 | A1* | 4/2023 | Hatter | H04L 9/3255 |
| | | | | 705/44 |
| 2023/0334846 | A1* | 10/2023 | Wang | G06V 10/774 |
| 2023/0354027 | A1* | 11/2023 | Engan | G06V 40/40 |

* cited by examiner

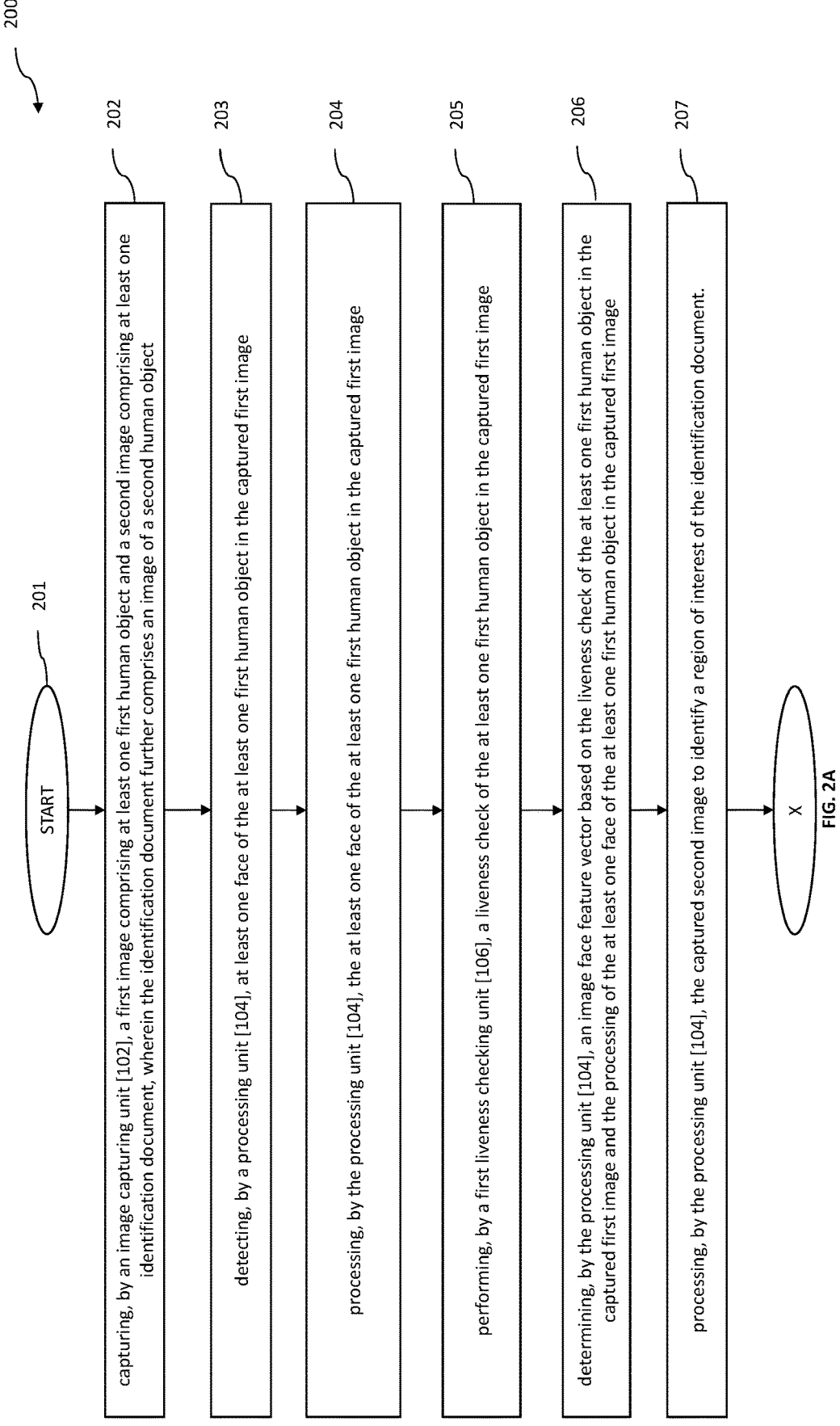

200

201

START 202
capturing, by an image capturing unit [102], a first image comprising at least one first human object and a second image comprising at least one identification document, wherein the identification document further comprises an image of a second human object 203
detecting, by a processing unit [104], at least one face of the at least one first human object in the captured first image 204
processing, by the processing unit [104], the at least one face of the at least one first human object in the captured first image 205
performing, by a first liveness checking unit [106], a liveness check of the at least one first human object in the captured first image 206
determining, by the processing unit [104], an image face feature vector based on the liveness check of the at least one first human object in the captured first image and the processing of the at least one face of the at least one first human object in the captured first image 207
processing, by the processing unit [104], the captured second image to identify a region of interest of the identification document.

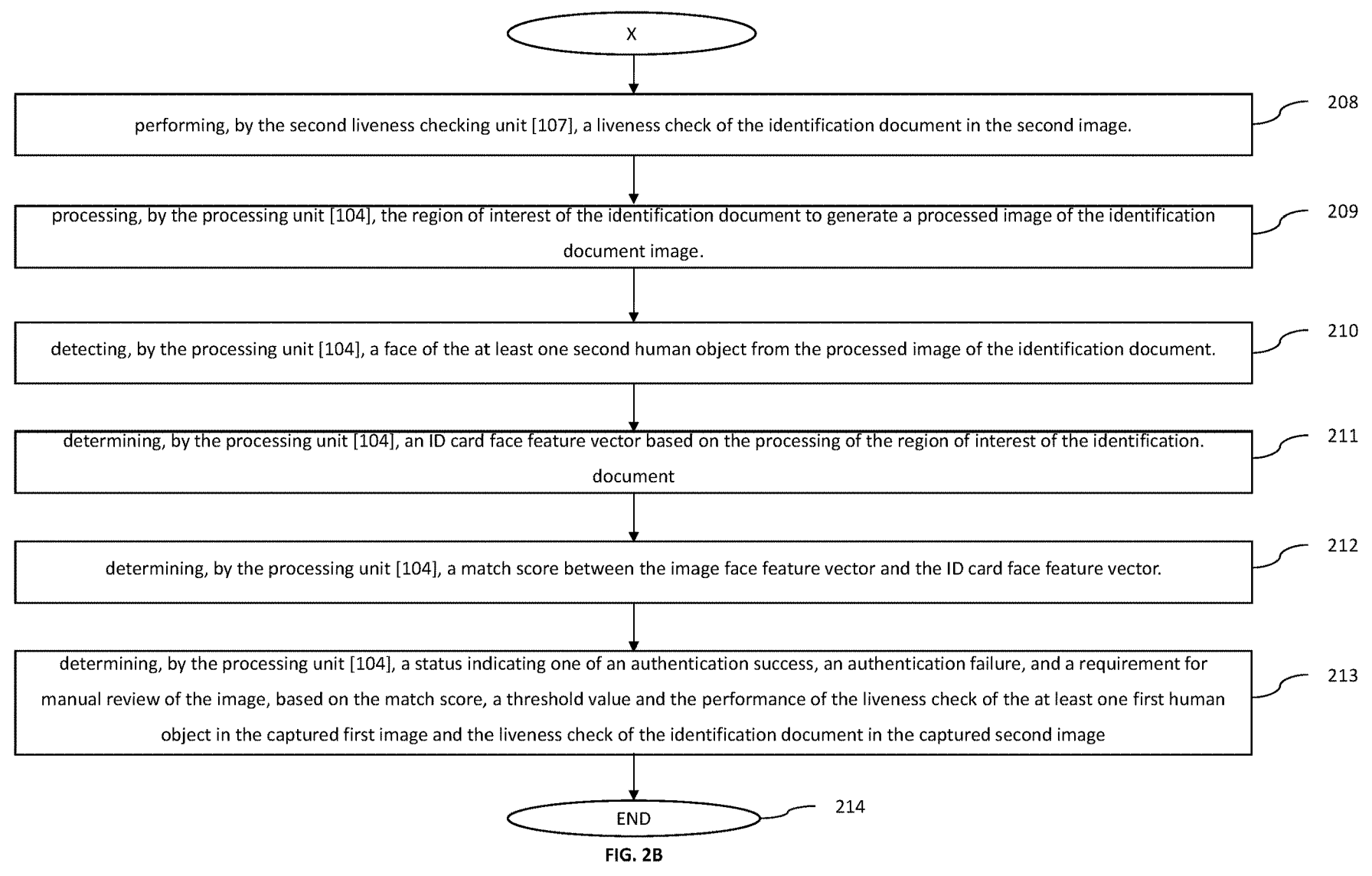

208 — performing, by the second liveness checking unit [107], a liveness check of the identification document in the second image.

209 — processing, by the processing unit [104], the region of interest of the identification document to generate a processed image of the identification document image.

210 — detecting, by the processing unit [104], a face of the at least one second human object from the processed image of the identification document.

211 — determining, by the processing unit [104], an ID card face feature vector based on the processing of the region of interest of the identification document 212 — determining, by the processing unit [104], a match score between the image face feature vector and the ID card face feature vector.

213 — determining, by the processing unit [104], a status indicating one of an authentication success, an authentication failure, and a requirement for manual review of the image, based on the match score, a threshold value and the performance of the liveness check of the at least one first human object in the captured first image and the liveness check of the identification document in the captured second image

END — 214

FIG. 2B

METHOD AND SYSTEM FOR IDENTITY VERIFICATION

CROSS-REFERENCE TO RELATED APPLICATION

This present disclosure claims benefit of U.S. provisional application No. 63/389,150 filed on Jul. 14, 2022, the disclosure of which is incorporated herein by reference in its entirety.

FIELD OF THE INVENTION

The present disclosure generally relates to methods and systems for authenticating identity of person(s). More particularly, the present disclosure relates to methods and systems for authenticating at least one human object (for e.g., a human face) and an identification document present in one or more images.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Identity authentication using image(s) based on image processing is performed to verify authenticity of an image and persons in the image. Thus, image authentication is required to mitigate various digital frauds during an identity verification, and has been successfully implemented in various use cases, such as during identity verification for: SIM card issuance for telecom companies, issuance of life or health insurance, and/or customer onboarding, etc.

Several solutions pertaining to image authentication have been developed over a period of time, however these solutions suffer from various limitations and drawbacks. For instance, the currently known solutions of image authentication provide a generic face match solution and fail to efficiently compare human faces, say selfie images with human faces identified from identification documents, which is crucial for identity verification. Also, the face quality checks (such as checks for identifying poor quality image(s), blur, low exposure image(s), glare effect on image(s), etc.) provided by the currently known solutions are not efficient.

It is also critical to analyze if the subject (say a human face in an image) has obstructions on its face (like masks or glasses) to perform identity verification with high accuracy, however the existing solutions do not perform an efficient attribute analysis on the captured face(s), and thus their identity verification is not reliable. For an efficient identity verification, the images of identification documents (IDs) and/or human objects need to be checked at least for digital forgeries to prevent frauds, however the currently known solutions fail to perform forgery checks and/or face manipulation checks on images of identification documents (IDs) and/or human objects.

The currently known solutions also do not perform ID card alignment which negatively affects the detection of a human face from the image of the ID card and therefore for identity verification this in turn, affects the face recognition accuracy. Furthermore, none of the existing solutions perform efficient ID card tampering checks before verifying a human face present in a captured image with a human face present in an image of the ID card.

Liveness checks are another critical aspect for real-world identity verification to at least ensure that the person whose image is captured is indeed present in person, and/or to ensure the image of the ID card(s) is captured in real time and the person indeed has the physical ID card(s) with him while capturing the image of the ID card(s). For proper real-world identity verification, the verification of the liveness of "both the image of the person and image of the ID card" is necessary, for e.g., apart from impersonation in images of person(s) say in selfies, people can impersonate/defraud by using digitally edited ID cards or stealing digital copies of other people's ID cards and swapping the existing face in said ID cards with theirs. However, for identity verification the currently known solutions fail to perform liveness checks for image(s) of ID card(s). In the absence of ID liveness check, the existing solutions end up comparing images of human objects (say selfies) and non-live ID card photos. Moreover, the non-live ID cards are known to have serious artifacts like moire effect which affects feature extraction and affect overall face recognition accuracy. Therefore, for identity verification (say for face verification with identification documents), it is necessary to provide an efficient solution for an efficient authentication of an image of at least one of a human object (say a human face) and an identification document.

Although the existing technologies have provided various solutions for identity verification via image authentication but these currently known solutions have many limitations and there is a need for improvement in this area of technology. Therefore, there is a need in the art to provide a solution to overcome the problems related to the currently known solutions and to provide a solution to efficiently verify of at least one of a human object and an identification document in an image for identity verification.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide method and system for authenticating identity of person(s). Also an object of the present invention is to provide a system and a method for authentication of at least one human object (i.e., a human face) and an identification document present in an image. Another object of the present invention is to verify a human face detected in an image captured in real time, with a human face detected in the identification document present in the image by taking into consideration image alignment, image quality, image manipulation, liveness checks, etc.

Furthermore, in order to achieve the aforementioned objectives, the present invention provides a method and system for authenticating identity of a user.

A first aspect of the present invention relates to the method for authenticating identity of a user. The method encompasses capturing, by an image capturing unit, a first image comprising at least one first human object and a second image comprising at least one identification document, wherein the identification document further comprises an image of a second human object. Further, the method encompasses detecting, by a processing unit, at least one face of the at least one first human object in the captured first image. Further, the method comprises processing, by the processing unit, the at least one face of the at least one first human object in the captured first image. Further, the method comprises performing, by a first liveness checking unit, a liveness check of the at least one first human object in the captured first image. The method further encompasses determining, by the processing unit, an image face feature vector based on the liveness check of the at least one first human object in the captured first image and the processing of the at least one face of the at least one first human object in the captured first image. Further, the method comprises processing, by the processing unit, the captured second image to identify a region of interest of the identification document. The method further comprises performing, by the second liveness checking unit, a liveness check of the identification document in the second image and processing, by the processing unit, the region of interest of the identification document to generate a processed image of the identification document image. Further, the method comprises detecting, by the processing unit, a face of the at least one second human object from the processed image of the identification document. The method further encompasses determining, by the processing unit, an ID card face feature vector based on the processing of the region of interest of the identification document. Thereafter, the method further encompasses determining, by the processing unit, a match score between the image face feature vector and the ID card face feature vector and determining, by the processing unit, a status indicating one of an authentication success, an authentication failure, and a requirement for manual review of the image, based on the match score, a threshold value and the performance of the liveness check of the at least one first human object in the captured first image and the liveness check of the identification document in the captured second image.

Another aspect of the present invention relates to a system for authenticating identity of a user. Also, the system comprises an image capturing unit configured to capture one or more first images of a first human object and one or more second images of an identification document, wherein the identification document further comprises an image of a second human object. Further, the system comprises a processing unit configured to detect the face of the first human object in the captured first image, detect the identification document in the captured second image, and process the identification document image from the second image. Further, the said processing unit is configured to process the extracted identification document image to generate a processed image of the identification document and detect the face of the second human object in the captured second image. Further, the said system further encompasses a first liveness checking unit configured to perform a liveness check of the at least one first human object in the captured first image, wherein the processing unit is further configured to determine an image face feature vector based on the processing of the detected face of the at least one first human object. Further, the said system further encompasses a second liveness checking unit configured to perform a liveness check of the identification document in the processed image of the captured second image, wherein the processing unit is further configured to determine an ID card face feature vector based on the processing of the detected face of at least one second human object. Furthermore, the processing unit is further configured to determine a match score between the image face feature vector and the ID card face feature vector and determine a status indicating one of an authentication success an authentication failure and a requirement for manual review of the image, based on the match score, a threshold value, and the performance of the liveness check of at least one first human object in the captured image and the liveness check of the identification document in the processed image of the captured second image.

BRIEF DESCRIPTION OF DRAWINGS

The accompanying drawings, which are incorporated herein, constitute a part of this disclosure. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. Although exemplary connections between sub-components have been shown in the accompanying drawings, it will be appreciated by those skilled in the art, that other connections may also be possible, without departing from the scope of the invention. All sub-components within a component may be connected to each other, unless otherwise indicated.

FIG. 2A and FIG. 2B illustrate an exemplary method flow diagram for authentication of an image, in accordance with exemplary embodiments of the present invention.

Figure 1:
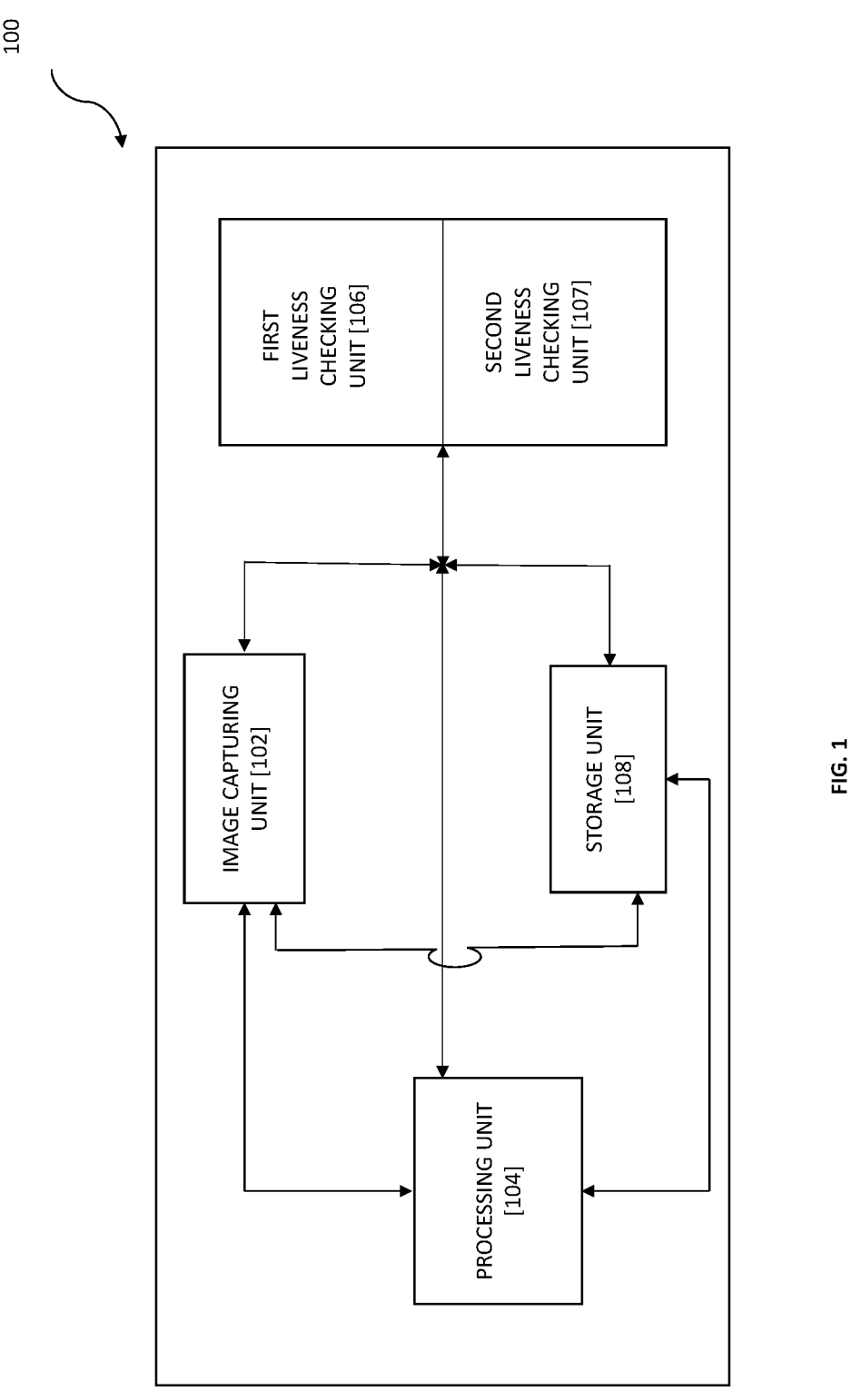
FIG. 1 illustrates an exemplary system diagram for authentication of an image, in accordance with exemplary embodiments of the present invention.

The foregoing shall be more apparent from a more detailed description of the invention below.

DETAILED DESCRIPTION OF THE DISCLOSURE

In the following description, for the purposes of explanation, various specific details are set forth in order to provide a thorough understanding of the embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The present invention relates to methods and systems for authenticating identity of person(s). The methods and systems of the present invention particularly relates to authenticating an image of at least one human object (e.g., a human face) against an identification document present in the same or different image. The invention firstly encompasses capturing an image (e.g., a selfie, etc.) via an image capturing unit of a system or a camera device such as a smartphone etc. In an instance, the present invention encompasses that the captured image comprises at least one human face and at least one identification document. In yet another instance, the present invention encompasses that the system prompts for receiving an image of at least one human face followed by another prompt for receiving an image for at least one identification document. Thereafter, the captured image/s are processed to detect at least one human face. Once the human face is detected in the captured image the invention encompasses performing face attribute checks, face quality checks, face liveness check, face manipulation checks and/or such other similar checks on the detected human face. Thereafter, the invention encompasses using a convolutional neural network-based feature extractor to determine an image face feature vector. Also, in an implementation if at least one of the steps of detection of human face(s), performing face attribute checks, performing face quality checks, performing face liveness check and/or performing face manipulation checks etc. fails, the invention encompasses providing an indication to re-capture the image.

The present invention further encompasses processing the image of the identification document. After capturing the image of the identification document (ID), the invention proceeds to detecting an identification document and cropping an ID region of interest (ROI) from the image of the ID using a convolutional neural network based object detector. Thereafter, the invention encompasses performing the steps of ID ROI alignment, ID liveness check, one or more ID quality checks, one or more ID tampering checks. The invention then encompasses identifying another human face in the image of the ID ROI. After identifying another human face in the image of the ID ROI, the invention encompasses using a convolutional neural network based feature extractor to determine an ID face feature vector. In an implementation if at least one of the steps of the detection of the ID, detection of the human face in the ID, performing the ID tampering checks, performing the ID quality checks and/or performing the ID liveness checks etc. fails, the invention encompasses providing an indication to re-capture the image of the ID.

Thereafter, the present invention proceeds to determining a match score between the image face feature vector and the ID face feature vector, wherein the match score is determined based on a cosine distance between the image face feature vector and the ID card face feature vector. Based on a threshold value, the match score is further used to determine a success status, say indicating one of an authentication success, an authentication failure and a requirement for manual review, of the image of at least one human object and the identification document, for identity verification. The present invention therefore discloses efficient authentication systems and method for authentication of an image of at least one human object (for e.g., a human face) and an identification document based on verifying the human object (i.e., the human face) present in the image with another human object (i.e., the human face) present in the identification document.

As used herein, a "processing unit" or "processor" or "operating processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, a graphics processing unit etc. The processor may perform signal coding data processing, input/output processing, and/or any other functionality that enables the working of the system according to the present disclosure. More specifically, the processor or processing unit is a hardware processor.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the server/system/user device to perform their respective functions.

As used herein, "a user equipment", "a user device", "a smart-user-device", "a smart-device", "an electronic device", "a mobile device", "a handheld device", may be any electrical, electronic and/or computing device or equipment, capable of implementing the features of the present disclosure. The user equipment/device may include, but is not limited to, a mobile phone, smart phone, laptop, a general-purpose computer, desktop, personal digital assistant, tablet computer, wearable device or any other computing device which is capable of implementing the features of the present disclosure. Also, the user device may contain at least one input means configured to receive an input from a processing unit, a transceiver unit, a storage unit and any other such unit(s) which are required to implement the features of the present disclosure. Also, "a wireless communication device", "a mobile communication device", "a communication device" or "a communication means" may form a part of the user device as well as the system, for example, the communication means comprising the transceiver units, antennae, along with other components may be present in both the user device and the system of the present disclosure.

As used herein, a "user interface" typically includes an output device in the form of a display, such as a liquid crystal display (LCD), cathode ray tube (CRT) monitors, light emitting diode (LED) screens, etc. and/or one or more input devices such as touchpads or touchscreens. The display may be a part of a portable electronic device such as smartphones, tablets, mobile phones, wearable devices, etc. They also include monitors or LED/LCD screens, television screens, etc. that may not be portable. The display is typically configured to provide visual information such as text and graphics. An input device is typically configured to perform operations such as issuing commands, selecting, and moving a cursor or selector in an electronic device.

The present disclosure is further explained in detail below with reference now to the diagrams.

Referring now to FIG. 1, an exemplary system diagram for authentication of an image, in accordance with exemplary embodiments of the present invention is shown.

The system encompasses at least one image capturing unit [102], at least one processing unit [104], at least one first liveness checking unit [106], at least one second liveness checking unit [107] and at least one storage unit [108]. All of these components/units of the system [100] are assumed to be connected to each other unless otherwise indicated below, and working in conjunction to achieve the objectives of the present invention. While only a few exemplary units are shown in FIG. 1, it may be understood that the system [100] may comprise multiple such units or the system [φ] may comprise any such numbers of the units performing said functionalities, obvious to a person skilled in the art or as required to implement the features of the present disclosure. Also, in some implementations, some of the components of the system [100] may be distributed in different devices/systems.

The system [100] may be implemented within a user equipment, or within a standalone device such as a kiosk or a specialized device.

In order to determine the authentication of the image for identity verification, firstly, an image capturing unit [102] configured to capture one or more first images of a first human object and one or more second images of an identification document. The identification document further comprises an image of a second human object. In an instance the first human object is a face of a first person and the second human object is a face of one of the first person and a second person. In an implementation of the present invention, the second human object can be the face of the first person or a second person who is different from the first person. In an ideal situation, the identity is verified or authenticated if the face of the first person detected in the image/selfie of the user is the same as the face detected from the ID card.

Also, in an implementation, the image capturing unit [102] captures the image (for example a selfie image) such that the captured image includes both the first human object and the identification document. However, the present disclosure is not limited thereto and in one other implementation the image capturing unit [102] may capture images separately for capturing the first human object and the identification document. Furthermore, in an implementation the image capturing unit [102] may be a part of a user device (for example a smartphone etc.) connected to the system [100] and the image capturing unit [102] in such implementation is connected with the system [100] via said user device. In another implementation, the image capturing unit [102] may be a part of standalone system [100].

After capturing the image of the first human object and the identification document, the image capturing unit [102] is configured to transmit the captured images to the processing unit [104]. The processing unit [104] of the system [100] is configured to detect the face of the first human object in the captured first image. In an implementation of present invention the processing unit [104] is configured to detect the face of the at least one first human object in the captured first image based on a detection technique, wherein the detection technique comprises a face bounding box detection technique, a face fiducial point detection technique and a technique based on cropping and aligning a largest human face present in the captured first image.

Considering an example where a selfie image is captured using a camera device connected to the system [100], the processing unit [104] of the system [100] in such example detects and crops one or more human faces in the selfie image using a neural network-based rotation-invariant face detector. As users often upload/capture pictures that can be rotated at any angle and are of different sizes depending on the distance from the image capturing unit [102], the related limitations of such scenarios are addressed using the rotation-invariant face detector. Therefore, the present invention encompasses use of the rotation-invariant face detector which may detect a face from a raw image say a selfie irrespective of an angle at which the face is present in the raw image. This decreases the user drop-offs because of false predictions from face detectors due to bad face angles.

Further, in an implementation, if only one human face is detected, the processing unit [104] via the face detector may detect five fiducial points corresponding to the left eye, right eye, nose, left corner of the lips, and right corner of the lips along with a face bounding box. Also, if multiple human faces are detected in the captured selfie image, the largest face is chosen by the processing unit [104] based on the area of bounding boxes. In an implementation the face fiducial points of the largest face are used to align and crop the face in such a way that the line between eyes is horizontal and the face is rescaled to a fixed size. In an event the processing unit [104] also processes the captured image to warp the face such that the detected fiducial points fall as close as possible to predefined positions of the face crop. Also, in an event if no face is detected in the captured image the user may be prompted by the processing unit [104] to recapture the selfie.

Further, the processing unit [104] is further configured to process the detected face, wherein processing of the detected face comprises performing at least one of one or more face attribute checks on the at least one first human object to detect one or more obstructions on the first human object, one or more face quality checks on the at least one first human object, and one or more face manipulation checks on the at least one first human object to detect image manipulation. In an event if any quality issues are detected, the processing unit [104] prompts the user to capture the image again, as artifacts like low exposure, blur, and brightness etc. interfere with feature extraction and decrease the face recognition accuracy.

Further, in an implementation of present invention, performing one or more face attributes checks further comprises performing, by the processing unit [104], at least one of a eyes closed check, a mask check, and a glasses check on the first image captured by the capturing unit [102]. Meaning thereby that the processing unit [104] checks if the user in the detected face in the first image is wearing a mask, or glasses, or is his/her eyes are open or closed or partially open. Since the presence of these artifacts affect face match accuracy, performing the face attribute checks prior to further processing, helps in achieving better accuracy. In case these artifacts are detected, the processing unit [104] is configured to generate a notification to re-capture the image, which is provided to the user.

Also, one or more face quality checks further comprises performing on the first image captured by the capturing unit [102] at least a blur check, an exposure check, and a brightness check. Quality issues like blur, over exposure, low exposure, very less or extremely brightness value interfere with or decrease the accuracy of feature extraction and face matching. Thus, performing face quality checks prior to further processing, also helps in achieving better accuracy.

Also, the one or more face manipulation checks further comprises performing on the first image captured by the capturing unit [102] at least a photoshop check and a deep fake check.

Further, once the first human object is detected in the captured first image, and preferably processed as described above, the processing unit [104] provides the processed first image to a first liveliness checking unit [106] in order to perform a liveness check of the at least one first human object in the captured first image Further, performing, by the first liveness checking unit [106], the liveness check of the at least one first human object in the first image, further comprises processing the captured image of the at least one first human object by a neural network-based liveness check module, wherein the neural network-based liveness check module indicates if the first human object is one of live and non-live. The face liveness check is performed to ensure that the person whose image (say a selfie) is captured is indeed present in person (i.e., is live). Also, in an implementation if the face liveness check indicates that the captured image of the first human object is non-live, the image authentication request is rejected and communicated to the user that the image authentication has failed. The face liveness check also directly improves face recognition accuracy as a non-live captured image of the first human object may have artifacts like glare and moire effect etc. that may interfere with a feature extraction process and may decrease a face recognition (FR) accuracy.

The processing unit [104] is further configured to determine an image face feature vector based on processing of the detected face of the at least one first human object.

Further the processing unit [104] is configured to detect the identification document in the captured second image. In case no identification document (ID) is detected in the captured image, the processing unit [104] generates and provides an indication to the user to recapture the ID image again.

Further, the processing unit [104] is configured to process the identification document image from the second image and process the extracted identification document image to generate a processed second image of the identification document. The processing to generate the second processed image further comprises detecting an ID card region of interest (ROI), cropping the region of interest (ROI) from the identification document via a convolutional neural network-based object detector, and aligning the region of interest to detect one or more text fields present on the image of the identification document. Thus, the processing unit [104] after detecting and cropping the ID card ROI, performs an ID ROI alignment by passing the cropped ID card ROI through a card aligner which uses a text detector to detect one or more text fields present on one or more images of document(s), and rotates the one or more images such that the one or more text fields are horizontal, making an entire ID card crop aligned.

In an implementation the convolutional neural network based object detector is customized for detecting identification documents of different countries to produce an ID card Region of Interest (ROI). Further, once the identification document is detected in the captured second image, a second liveliness checking unit [107] in order to further process the captured image, is configured to perform a liveness check on the identification document in the processed image of the captured second image. This liveness check may be performed on the aligned image of the identification document via the neural network-based liveness checking unit.

Also, it is pertinent to note that although in the present disclosure it is disclosed that the processing unit [104] performs the liveness check on image of the first human object and the image of the identification document via a different liveness checking unit (i.e., the first liveness checking unit [106] and second liveliness checking unit [107]), but the disclosure is not limited thereto and the processing unit [104] may perform the liveness check on image of the first human object and the image of the identification document via a single liveness checking unit.

More specifically, to perform the liveness check on the image of the identification document, the captured/aligned ID card image is checked to determine whether it is an image of a physical ID or of a digital copy of the ID, by passing the captured/aligned ID card image to a neural network-based liveness check module. In an implementation in order to perform the ID liveness check, a cropped and aligned image of an ID card is passed into a deep convolutional neural network which predicts whether the cropped and aligned image of the ID card is of a physical ID card (i.e., a live ID) or captured from a digital display device showing the ID card (i.e., a non-live ID). In the given implementation the deep convolutional neural network consists of a sequence of convolutional blocks containing convolutional layers, batch normalization layers, and non-linear activation layers with varying convolutional kernel sizes and channel statistics, and the deep convolutional neural network is a classification model which is trained to predict one of 2 classes—live or non-live.

In an implementation of the present invention, performing an ID liveness check on the aligned image of the identification document further includes performing one or more ID quality checks on the processed image of the second image, wherein one or more ID quality checks further comprise performing on the processed image of the captured second image at least a blur check, an exposure check, and a glare check. In a preferred implementation of the present invention, to perform a glare check, processing unit [104] is configured to pass the aligned image of the identification document via the convolutional neural network to detect at least one of an overexposed region and a region with patches of glare; thereafter, the processing unit [104] compares the detected at least one of the overexposed region and the region with patches of glare with the template of the captured ID card in the storage unit [108] to detect the region of glare. The one or more ID quality checks are performed to overcome the limitations such as an impact on feature extraction and a decreased face recognition accuracy occurred due to artifacts like glare, low brightness, and blur etc. Also, in an implementation the processing unit [104] to perform the one or more ID quality checks is configured to pass the captured image of the identification document through a neural network-based module and in case if any quality issues detected, the processing unit [104] prompts the user to capture the image again.

Furthermore, in an exemplary implementation, in order to perform a glare check on a region of interest such as on an identity card present in a captured image, the processing unit [104] passes a cropped and aligned ID card image (ROI) from said captured image to a deep convolutional neural network which predicts whether the captured ID card image contains glare on the region of interest, where the deep convolutional neural network consists of a sequence of convolutional blocks containing convolutional layers, batch normalization layers, and non-linear activation layers with varying convolutional kernel sizes and channel statistics. Also, in the given implementation the deep convolutional neural network may be a segmentation model which is trained to output binary segmentation maps that locate where one or more glare regions are present on one or more captured ID card images. In an instance, the detected glare regions may be compared with a template of the captured ID card to estimate if the detected glare regions are on or around a face present in the captured ID card image. More specifically, in such instance a detected face bounding box is compared with one or more predicted glare segmentation maps to compute intersection over union (IOU) between them. In an event if the IOU is greater than zero, it indicates that the glare is present partly on the face present in the captured ID card image and the captured ID card image is then rejected as the presence of glare reduces the quality of the face present in the captured ID card image and results in loss of some face information, which will negatively affect the face feature extraction and face matching process. Therefore, the deep convolutional neural network detects on the cropped and aligned ID card image, one or more regions which are overexposed or contain patches of glare that obfuscate the information present on the card.

Further, performing an ID liveness check on the aligned image of the identification document further encompasses performing one or more ID tampering checks on the processed image of the second image, wherein one or more ID tampering checks further comprise performing on the processed image of the captured second image at least a text tampering check, and a photo tampering check. In an implementation the one or more ID tampering checks are performed by passing by the processing unit [104], the captured image of the identification document to neural network-based module, to check if a text on the ID is modified manually to impersonate a different person as unique identification numbers, names, Date of Birth etc. in IDs are commonly tampered to assume a false identity. Also, in an implementation the captured image of the identification document is passed through the neural network-based module for checking digital tampering like a photo-shopped face, and/or for checking physical tampering like an original photo on the identification document replaced with a different photo in an attempt to impersonate. Also, in an event if any kind of tampering is detected on the ID detected in the captured image, an error message is displayed and communicated by the processing unit [104] to the user that the image authentication has failed.

Further, images of the non-live ID card (for e.g., ID card images displayed on a digital screen like a smartphone screen, monitor, or computer display) may contain distinctive patterns such as the Moiré pattern, and the deep convolutional neural network may be trained to detect whether the captured ID image is non-live by analyzing these patterns present in the captured ID image and by detecting artifacts such as Moiré pattern, glare etc. Such artifacts like glare and moire effect may interfere with feature extraction and decrease the face recognition (FR) accuracy and in such cases checking liveness directly improves the face recognition accuracy. Therefore, the ID liveness check performed by the second liveness check unit [107] with the processing unit [104] only provides more credibility to proof of possession, as in the absence of this check, fraudsters could potentially misuse digital images of ID cards without the owner's permission. Also, in an implementation if the ID liveness check indicates that the captured image of the ID is non-live, the image authentication request is rejected and communicated to the user that the image authentication has failed.

Further, the processing unit [104] is also configured to detect the image of the second human object from the captured image of the identification document, where the second human object is the face of one of the first person and the second person, and the second human object may be identified based on at least one of a face bounding box detection technique, face fiducial point detection technique and techniques used to crop and align a largest human face present in the captured image of the ID, etc. In an implementation of the present invention, the second human object can be the face of the first person or a second person who is different from the first person. In an implementation the image of the second human object is detected from the cropped and aligned ID card image (i.e., ROI). Also, in an implementation to detect an image of a second human object, an ID card image is first detected and cropped from a captured image using a neural network-based rotation-invariant face detector. Thereafter, five fiducial points on a face present in the ID card image corresponding to the left eye, right eye, nose, left corner of the lips, and right corner of the lips along with the face bounding box are detected. Also, in an event if multiple faces are detected in ID card image, a largest face is chosen based on an area of bounding boxes. Also, in an implementation the face fiducial points of the largest face are used to align and crop the face in such a way that the line between eyes is horizontal and the face is rescaled to a fixed size. The processing unit [104] further processes the captured image to warp the face such that the detected fiducial points fall as close as possible to predefined positions of the face crop. Furthermore, in an event if no face is detected in the ID card image, the user is prompted by the processing unit [104] to recapture the image of the ID.

Once the images of the first human object and the second human image in the identification document are processed, the processing unit [104] is then configured to determine an image face feature vector and an ID card face feature vector based on the processing of the images of the first human object and the identification document, respectively. In an implementation to determine the image face feature vector, the image of the first human object may be passed through a face feature extractor convolutional network or deep convolutional network, where the image of the first human object (i.e., RGB image) is first normalised and fed into an input layer of the deep convolutional network. The output of this layer is successively fed through many deep convolutional layers. The image of the first human object reduces in dimension in each step till finally a single vector of 256 float values (i.e., the image face feature vector) is obtained. This vector (i.e., the image face feature vector) holds a compact representation of the input image of the first human object, which can be compared with other such vectors later in the pipeline. Also, in an implementation to determine the ID card face feature vector, an image of a second human object detected from a cropped and aligned ID card image (i.e., from an ID ROI) is passed through the face feature extractor convolutional network. Thereafter, the image of the second human object detected from the ID ROI (i.e., RGB image) is first normalised and fed into the input layer of the deep convolutional network. The output of this layer is successively fed through many layers of deep convolutional layers. The image of the second human object detected from the ID ROI reduces in dimension in each step until finally a single vector of 256 float values (i.e., the ID card face feature vector) is obtained. This vector (i.e., the ID card face feature vector) holds a compact representation of the input image of the second human object detected from the ID ROI which can be compared with other such vectors later in the pipeline.

The processing unit [104] after determining the image face feature vector and the ID face feature vector is configured to determine a match score between the image face feature vector and the ID face feature vector, wherein the match score is determined based on a cosine distance between the image face feature vector and the ID card face feature vector. In an exemplary implementation, a cosine distance between the image face feature vector and the ID card face feature vector is first computed. Thereafter, the computed cosine distance is modified into a match score by transforming the cosine distance which lies in the range of 0 and 2 to a match score in the range of 0 to 100. 0 indicating the least similarity and 100 indicating the highest similarity.

The processing unit [104] is then configured to determine a status indicating one of an authentication success, an authentication failure and a requirement for manual review, of the image the of first human object and the identification document, based on the match score (or the cosine distance between the image face feature vector and the ID card face feature vector) and a threshold value. For instance, in an implementation, if the cosine distance between the image feature vector and the ID card face feature vector is above a certain threshold "a", then the first human object (i.e., the face of the first person) and the second human object (i.e., the face of the first person or the second person) are declared a match and a success message is returned. Also, in case if the cosine distance is below a certain different threshold "b", then the first human object and the second human object are declared a non-match and a failure message is returned. Furthermore, if the cosine distance is between the two above-mentioned thresholds "a" and "b", then image authentication request is flagged for further review (i.e., the manual review) using a to-be-reviewed message. Also, in an event if the image authentication request is flagged as to-be-reviewed, the processing unit [104] is further configured to notify the user that the image authentication request is to be reviewed within a specified timeframe and the user may be reached out for further clarification or with a verification status.

Furthermore, in the given event the image of the first human object and the identification document may be uploaded to a web-based review portal by the processing unit [104], where such portal displays both the image of the first human object and the identification document side by side along with the cropped human faces present in the image of the first human object and in the image of the identification document. Thereafter, a human reviewer may look at the portal and review whether a human face in the image of the first human object is the same as that of a face from the image of the Identification document, and the human reviewer may then press a corresponding icon on a screen on which the web-based review portal is displayed to enter or clear a response. If the response entered by the human reviewer is "match", then the user receives a notification that the image authentication request has been processed and the verification is successful, and if the response by the human reviewer is "no match", then the user receives a notification that the image authentication request is rejected, and the verification has failed. Therefore, the web-based review portal is streamlined for maximum efficiency and minimal reviewer effort.

Referring now to FIG. 2A and FIG. 2B, that illustrates an exemplary method flow diagram for authentication of an image in accordance with exemplary embodiments of the present invention. In an implementation the method is performed by the system [100]. As shown in FIG. 2A, the method begins at step 201. In an implementation the method may begin upon receiving a request for authentication of an image for identity verification. In an event the system [100] is implemented in the user device, the authentication request may be received from an application such as a banking application, etc. In an event the system [100] is implemented in a kiosk, the authentication request is received from the user via the user interface of the kiosk.

Next, at step [202], the method encompasses capturing, by an image capturing unit [102], a first image comprising at least one first human object and a second image comprising at least one identification document, wherein the identification document further comprises an image of a second human object. In an instance the first human object is a face of a first person and the second human object is a face of the first person or a second person. Also, in an implementation, the image capturing unit [102] captures the image (for example, a selfie image) such that the captured image includes both the first human object and the identification document. However, the present disclosure is not limited thereto, and in one other implementation, the image capturing unit [102] may capture images separately for capturing the first human object and the identification document.

Further, at step [203], the method encompasses detecting, by a processing unit [104], at least one face of at least one first human object in the captured first image. More specifically, the captured image of the first human object is processed to detect the first human object (say the face of the first person) in the image. In an implementation the processing unit [104] encompasses use of techniques such as including but not limited to face bounding box detection technique, face fiducial point detection technique and/or techniques used to crop and align a largest human face present in the captured image etc. for detection of the first human object. Also, considering an example where a selfie image is captured using a camera device connected to the system [100], the processing unit [104] of the system [100] in such example detects and crops one or more human faces in the selfie image using a neural network-based rotation-invariant face detector Further, at step [204], the method encompasses processing, by the processing unit [104], the at least one face of the at least one first human object in the captured first image. For ease of understanding, consider an example where a selfie image is captured using a camera device. The method [200] as disclosed by the present disclosure would detect and crop one or more human faces in the selfie image using a neural network-based rotation-invariant face detector. As users often upload or capture pictures that can be rotated at any angle and are of different sizes depending on the distance from the image capturing unit [102], the related limitations of such scenarios are addressed using the rotation-invariant face detector. Therefore, the present invention encompasses the use of the rotation-invariant face detector, which may detect a face from a raw image, say, a selfie, irrespective of the angle at which the face is present in the raw image. This decreases user drop-offs because of false predictions from face detectors due to bad face angles.

Further, in an implementation, if in the given example only one human face is detected, the processing unit [104] via the face detector may detect five fiducial points corresponding to the left eye, right eye, nose, left corner of the lips, and right corner of the lips, along with a face bounding box. Also, if in the given example multiple human faces are detected in the captured selfie image, the largest face is chosen by the processing unit [104] based on the area of the bounding boxes. In an implementation, the face fiducial points of the largest face are used to align and crop the face in such a way that the line between eyes is horizontal and the face is rescaled to a fixed size. In an event, the processing unit [104] also processes the captured image to warp the face such that the detected fiducial points fall as close as possible to predefined positions of the face crop. Also, in an event where no face is detected in the captured image, the user may be prompted by the processing unit [104] to recapture the selfie.

Further, at step [205], the method encompasses performing, by a first liveness checking unit [106], a liveness check of the at least one first human object in the captured first image. It is pertinent to note that although in the present disclosure it is disclosed that the processing unit [104] performs the liveness check on image of the first human object and the image of the identification document via a two separate liveness checking unit (i.e., the first liveness checking unit [106] and the second liveliness checking unit [107]), but the disclosure is not limited thereto and the processing unit [104] may perform the liveness check on image of the first human object and the image of the identification document via a single liveness checking unit. Further, performing, by the first liveness checking unit [106], the liveness check of the at least one first human object in the first image, further comprises processing the captured image of the at least one first human object by a neural network-based liveness check module, wherein the neural network-based liveness check module indicates if the first human object is one of live and non-live. The face liveness check is performed to ensure that the person whose image (say a selfie) is captured is indeed present in person (i.e., is live). Also, in an implementation if the face liveness check indicates that the captured image of the first human object is non-live, the image authentication request is rejected and communicated to the user that the image authentication has failed. The face liveness check also directly improves face recognition accuracy as a non-live captured image of the first human object may have artifacts like glare and moire effect etc. that may interfere with a feature extraction process and may decrease a face recognition (FR) accuracy.

Further, in an implementation of the method as disclosed by the present disclosure, includes processing of the detected face prior to performing the liveness check. This processing further comprises performing at least one of one or more face attribute checks on the at least one first human object to detect one or more obstructions on the first human object, one or more face quality checks on the at least one first human object, and one or more face manipulation checks on the at least one first human object to detect image manipulation. In the event that any quality issues are detected, the processing unit [104] prompts the user to capture the image again, as artefacts like low exposure, blur, and brightness, etc. interfere with feature extraction and decrease the face recognition accuracy.

Further, in an implementation of the present invention, performing one or more face attribute checks further comprises performing, by the processing unit [104], at least one of an eyes closed check, a mask check, and a glasses check on the first image captured by the capturing unit [102]. Also, one or more face quality checks further comprise performing, on the first image captured by the capturing unit [102], at least a blur check, an exposure check, and a brightness check. Also, one or more face manipulation checks further comprise performing, on the first image captured by the capturing unit [102], at least a Photoshop check and a deep fake check. In a preferred implementation of the present invention, one or more face attribute checks are performed to detect one or more obstructions (like masks, closed eyes, or the wearing of glasses, etc.) on the first human object and to perform identity verification with high accuracy. In an event where one or more obstructions on the first human object are detected, the processing unit [104] generates and provides an indication to the user to recapture the image as the presence of one or more obstructions may affect face match accuracy.

Next at step [206], the method comprises determining, by the processing unit [104], an image face feature vector based on the liveness check of the at least one first human object in the captured first image and the processing of the at least one face of the at least one first human object in the captured first image. In an implementation to determine the image face feature vector, the image of the first human object may be passed through a face feature extractor convolutional network or deep convolutional network, where the image of the first human object (i.e., RGB image) is first normalised and fed into an input layer of the deep convolutional network. The output of this layer is successively fed through many deep convolutional layers. The image of the first human object reduces in dimension in each step till finally a single vector of 256 float values (i.e., the image face feature vector) is obtained. This vector (i.e., the image face feature vector) holds a compact representation of the input image of the first human object, which can be compared with other such vectors later in the pipeline.

Further, at step [207], the method encompasses processing, by the processing unit [104], the captured second image to identify a region of interest in the identification document. Also, the method encompasses processing, by the processing unit [104], the captured image of the identification document to detect the identification document in the captured image and crop an ID card region of interest (ROI) using a convolutional neural network based object detector. In the event that no identification document (ID) is detected in the captured image, the processing unit [104] generates and provides an indication to the user to recapture the ID image again. In one implementation, a convolutional neural network-based object detector is tailored to detect identification documents from various countries in order to generate an ID card region of interest (ROI). Also, the processing unit [104], after detecting and cropping the ID card ROI, performs an ID card ROI alignment by passing the cropped ID card ROI through a card aligner, which uses a text detector to detect one or more text fields present on one or more images of document(s) and rotates the one or more images such that the one or more text fields are horizontal, making the entire ID card crop aligned.

As shown in FIG. 2B, at step [208], the method encompasses performing, by the second liveness checking unit

[107], a liveness check of the identification document in the second image. In a preferred implementation of the present invention, after performing the alignment, the processing unit [104] performs an ID liveness check on the aligned image of the identification document via the second liveness checking unit [107]. More specifically, the captured/aligned ID card image is checked to determine whether it is an image of a physical ID or of a digital copy of the ID, by passing the captured/aligned ID card image to a neural network-based liveness check module. In an implementation, in order to perform the ID liveness check, a cropped and aligned image of an ID card is passed into a deep convolutional neural network, which predicts whether the cropped and aligned image of the ID card is of a physical ID card (i.e., a live ID) or is captured from a digital display device showing the ID card (i.e., a non-live ID). In the given implementation, the deep convolutional neural network consists of a sequence of convolutional blocks containing convolutional layers, batch normalisation layers, and non-linear activation layers with varying convolutional kernel sizes and channel statistics, and the deep convolutional neural network is a classification model that is trained to predict one of 2 classes—live or non-live.

In an implementation of the present invention, performing an ID liveness check on the aligned image of the identification document further includes performing one or more ID quality checks on the processed image of the second image, wherein one or more ID quality checks further comprise performing on the processed image of the captured second image at least a blur check, an exposure check, and a glare check. In a preferred implementation of the present invention, to perform a glare check processing unit [104] is configured to pass the aligned image of the identification document via the convolutional neural network to detect at least one of an overexposed region and a region with patches of glare; thereafter, the processing unit [104] compares the detected at least one of the overexposed region and the region with patches of glare with the template of the captured ID card in the storage unit [108] to detect the region of glare. One or more ID quality checks are performed to overcome limitations such as feature extraction impact and decreased face recognition accuracy due to artefacts such as glare, low brightness, blur, and so on. Also, in an implementation, the processing unit [104] to perform the one or more ID quality checks is configured to pass the captured image of the identification document through a neural network-based module, and in the event that any quality issues are detected, the processing unit [104] prompts the user to capture the image again.

Furthermore, in an exemplary implementation, in order to perform a glare check on a region of interest such as on an identity card present in a captured image, the processing unit [104] passes a cropped and aligned ID card image (ROI) from said captured image to a deep convolutional neural network that predicts whether the captured ID card image contains glare on the region of interest, where the deep convolutional neural network consists of a sequence of convolutional blocks containing convolutional layers, batch normalisation layers, and non-linear activation layers with varying convolutional kernel sizes and channel statistics. Also, in the given implementation, the deep convolutional neural network may be a segmentation model that is trained to output binary segmentation maps that locate where one or more glare regions are present on one or more captured ID card images. In an instance, the detected glare regions may be compared with a template of the captured ID card to estimate if the detected glare regions are on or around a face present in the captured ID card image. More specifically, in such an instance, a detected face bounding box is compared with one or more predicted glare segmentation maps to compute the intersection over union (IOU) between them. In an event where the IOU is greater than zero, it indicates that the glare is present partly on the face present in the captured ID card image, and the captured ID card image is then rejected as the presence of glare reduces the quality of the face present in the captured ID card image and results in the loss of some face information, which will negatively affect the face feature extraction and face matching processes. Therefore, the deep convolutional neural network detects, on the cropped and aligned ID card image, one or more regions that are overexposed or contain patches of glare that obscure the information present on the card.

Further, performing an ID liveness check on the aligned image of the identification document further encompasses performing one or more ID tampering checks on the processed image of the second image, wherein one or more ID tampering checks further comprise performing on the processed image of the captured second image at least a text tampering check, and a photo tampering check. In an implementation, one or more ID tampering checks are performed by passing, by the processing unit [104], the captured image of the identification document to the neural network-based module to check if a text on the ID is modified to impersonate a different person, as unique identification numbers, names, date of birth, etc. in IDs are commonly tampered to assume a false identity. Also, in an implementation, the captured image of the identification document is passed through the neural network-based module for checking digital tampering like a photo-shopped face, and/or for checking physical tampering like an original photo on the identification document replaced with a different photo in an attempt to impersonate. In addition, if any tampering is detected on the ID detected in the captured image, the processing unit [104] displays and communicates to the user that the image authentication has failed.

Further, images of the non-live ID card (for e.g. ID card images displayed on a digital screen like a smartphone screen, monitor, or computer display) may contain distinctive patterns such as the Moiré pattern, and the deep convolutional neural network may be trained to detect whether the captured ID image is non-live by analyzing these patterns present in the captured ID image and by detecting artifacts such as Moiré pattern, glare etc. Also, the artifacts like glare and moire effect interfere with feature extraction and decrease the face recognition (FR) accuracy and in such cases checking liveness directly improves the face recognition accuracy. Also, in an implementation if the ID liveness check indicates that the captured image of the ID is non-live, the image authentication request is rejected and communicated to the user that the image authentication has failed.

Further, at step [209], the method encompasses processing, by the processing unit [104], the region of interest of the identification document to generate a processed image of the identification document image. The processing to generate the second processed image further comprises detecting an ID card region of interest (ROI), cropping the region of interest (ROI) from the identification document via a convolutional neural network-based object detector, and aligning the region of interest to detect one or more text fields present on the image of the identification document. In the event that no identification document (ID) is detected in the captured image, the processing unit [104] generates and provides an indication to the user to recapture the ID image again. In one implementation, a convolutional neural network-based object detector is tailored to detect identification documents from various countries in order to generate an ID card region of interest (ROI).

Next, at step [210], the method encompasses detecting, by the processing unit [104], a face of the at least one second human object from the processed image of the identification document. In an implementation, the image of the second human object is detected from the cropped and aligned ID card image (i.e., ROI). Also, in an implementation to detect the image of a second human object, an ID card image is first detected and cropped from a captured image using a neural network-based rotation-invariant face detector. Further, five fiducial points on a face present in the ID card image, corresponding to the left eye, right eye, nose, left corner of the lips, and right corner of the lips, along with the face bounding box, are detected. Also, in an event where multiple faces are detected in an ID card image, the largest face is chosen based on an area of bounding boxes. Also, in an implementation, the face fiducial points of the largest face are used to align and crop the face in such a way that the line between eyes is horizontal and the face is rescaled to a fixed size. The processing unit [104] further processes the captured image to warp the face such that the detected fiducial points fall as close as possible to predefined positions of the face crop. Furthermore, in an event where no face is detected in the ID card image, the user is prompted by the processing unit [104] to recapture the image of the ID.

Then the method moves to step [211], the method at step [211] encompasses determining, by the processing unit [104], an ID card face feature vector based on the processing of the region of interest of the identification. Document. in an implementation to determine the ID card face feature vector, an image of a second human object detected from a cropped and aligned ID card image (i.e., from an ID ROI) is passed through the face feature extractor convolutional network. Thereafter, the image of the second human object detected from the ID ROI (i.e., RGB image) is first normalized and fed into the input layer of the deep convolutional network. The output of this layer is successively fed through many layers of deep convolutional layers. The image of the second human object detected from the ID ROI reduces in dimension in each step till finally, a single vector of 256 float values (i.e., the ID card face feature vector) is obtained. This vector (i.e., the ID card face feature vector) holds a compact representation of the input image of the second human object detected from the ID ROI which can be compared with other such vectors later in the pipeline.

Further, at step [212], the method comprises determining, by the processing unit [104], a match score between the image face feature vector and the ID card face feature vector. In an implementation, the processing unit [104] after determining the image face feature vector at step [206] and the ID face feature vector at step [211], is configured to determine a match score between the image face feature vector and the ID face feature vector, wherein the match score is determined based on a cosine distance between the image face feature vector and the ID card face feature vector. In an exemplary implementation, a cosine distance between the image face feature vector and the ID card face feature vector is first computed. Thereafter, the computed cosine distance is modified into a match score by transforming the cosine distance, which lies in the range of 0 and 2, into a match score in the range of 0 to 100. 0 indicating the least similarity and 100 indicating the highest similarity.

Thereafter, at step [213], the method via processing unit [104] is configured to determine a status indicating one of an authentication success, an authentication failure, or a requirement for manual review, of the image of the first human object and the identification document, based on the match score (or the cosine distance between the image face feature vector and the ID card face feature vector) and a threshold value. For instance, in an implementation, if the cosine distance between the image feature vector and the ID card face feature vector is above a certain threshold "a,", then the first human object (i.e., the face of the first person) and the second human object (i.e., the face of one of the first person and the second person) are declared a match, and a success message is returned. In addition, if the cosine distance is less than a certain threshold "b," the first and second human objects are declared non-matches, and a failure message is returned. Furthermore, if the cosine distance is between the two above-mentioned thresholds "a" and "b," then the image authentication request is flagged for further review (i.e., the manual review) using a to-be-reviewed message. Also, in an event that the image authentication request is flagged as to-be-reviewed, the processing unit [104] is further configured to notify the user that the image authentication request is to be reviewed within a specified timeframe and the user may be reached out for further clarification or with a verification status.

Furthermore, in the given event, the image of the first human object and the identification document may be uploaded to a web-based review portal by the processing unit [104], where such a portal displays both the image of the first human object and the identification document side by side along with the cropped human faces present in the image of the first human object and in the image of the identification document. Thereafter, a human reviewer may look at the portal and review whether a human face in the image of the first human object is the same as that of a face in the image of the identification document, and the human reviewer may then press a corresponding icon on a screen on which the web-based review portal is displayed to enter or clear a response. If the response entered by the human reviewer is "match,", then the user receives a notification that the image authentication request has been processed and the verification has been successful; if the response entered by the human reviewer is "no match,", then the user receives a notification that the image authentication request has been rejected, and the verification has failed. Therefore, the web-based review portal is streamlined for maximum efficiency with minimal reviewer effort.

Pursuant to that, the method terminates at step [214].

The technical solutions in this disclosure propose novel techniques for a system and method for authentication of an image of at least one human object (for example, a human face) and an identification document based on verifying the human object (i.e., the human face) present in the image with another human object (i.e., the human face) present in the identification document, for identity verification. The technical solutions of the present disclosure also provide a technical advancement over the currently known solutions at least by: 1) providing an identity verification by determining the authentication of an image (e.g., a selfie) of a person and an identity document; and 2) determining the authentication of one or more images based at least on performing a liveness check on a person and/or an ID card present in said one or more images. Also, the present solution is technically superior to the currently known solutions, as in the present solution, along with the liveness check, other checks such as quality checks, face manipulation checks, tampering checks, etc. are also performed for the authentication of an image of at least one human object (for example, a human face) and an identification document.

Also, the technical solutions of the present disclosure have use cases in at least the following:

1. Identity verification for SIM card issuance by telecom companies
2. Identity verification for contactless and remote loan issuance
3. Identity verification for the issuance of life certificates for pensioners remotely
4. Identity verification for the issuance of life or health insurance
5. Identity verification during virtual video verification for customer onboarding to a multitude of financial services
6. Identity verification for customer onboarding for a trading account While the invention has been explained with respect to many examples, it will be appreciated by those skilled in the art that the invention is not restricted by these examples and that many changes can be made to the embodiments disclosed herein without departing from the principles and scope of the present invention.

We claim:

1. A method for authenticating identity of a user, the method comprising;

capturing, by an image capturing unit [102], a first image comprising at least one first human object and a second image comprising at least one identification document, wherein the identification document further comprises an image of a second human object;

detecting, by a processing unit [104], at least one face of the at least one first human object in the captured first image based on a neural network-based rotation-invariant face detector;

dropping, based on the detected first human object in the captured first image, at least one of a plurality of low-quality non-facial residual objects from the captured first image;

processing, by the processing unit [104], the at least one face of the at least one first human object in the captured first image, wherein processing the at least one face of the at least one first human object in the captured first image further comprises performing:

one or more face attribute checks on the at least one first human object in the first image to detect one or more obstructions on the first human object, one or more face quality checks on the at least one first human object in the first image using 256-dimensional face feature vector, and one or more face attribute checks on the at least one first human object in the first image to detect image manipulation;

performing, by a first liveness checking unit [106], a liveness check of the at least one first human object in the captured first image;

determining, by the processing unit [104], an image face feature vector based on the liveness check of the at least one first human object in the captured first image and the processing of the at least one face of the at least one first human object in the captured first image;

processing, by the processing unit [104], the captured second image to:

identify a region of interest of the identification document based on a location of a user; and crop the identified region of interest from the captured second image;

performing, by the second liveness checking unit [107], a liveness check of the identification document in the second image;

processing, by the processing unit [104], the region of interest of the identification document to generate a processed image of the identification document image, wherein the step of said processing further comprises:

performing, by the processing unit [104], one or more ID quality checks on the region of interest of the identification document;

performing, by the processing unit [104], one or more ID tampering checks on the region of interest of the identification document; and performing, by the processing unit, one or more ID quality checks using 256-dimensional face feature vector;

detecting, by the processing unit [104], a face of the at least one second human object from the processed image of the identification document;

dropping, based on the detected second human object in the processed image of the identification document, at least one of a plurality of low-quality non-facial residual objects from the image of the identification document;

determining, by the processing unit [104], an ID card face feature vector based on the processing of the region of interest of the identification document;

determining, by the processing unit [104], a match score between the image face feature vector and the ID card face feature vector; and determining, by the processing unit [104], a status indicating one of an authentication success, an authentication failure, and a requirement for manual review of the image, based on the match score, a threshold value and the performance of the liveness check of the at least one first human object in the captured first image and the liveness check of the identification document in the captured second image.

2. The method of claim 1, wherein the match score is determined based on a cosine distance between the image face feature vector and the ID card face feature vector.

3. The method of claim 1, wherein detecting, by the processing unit [104], the face of the at least one first human object in the captured first image is based on a detection technique, wherein the detection technique comprises: a face bounding box detection technique, a face fiducial point detection technique and a technique based on cropping and aligning a largest human face present in the captured first image.

4. The method of claim 1, wherein performing one or more face attributes checks further comprises performing, by the processing unit, at least one of a eyes closed check, a mask check, and a glasses check on the first image captured by the capturing unit [102].

5. The method of claim 1, wherein performing one or more face quality checks further comprises performing, by the processing unit [104], at least one of a blur check, an exposure check, and a brightness check on the first image captured by the capturing unit [102].

6. The method of claim 1, wherein performing one or more face manipulation checks further comprises performing at least one of a photoshop check and a deep fake check, on the first image captured by the capturing unit [102].

7. The method of claim 1, wherein performing, by the first liveness checking unit [106], the liveness check of the at least one first human object in the first image, further comprises processing the captured image of the at least one first human object by a neural network-based liveness check module, wherein the neural network-based liveness check module indicates if the first human object is one of live and non-live.

8. The method of claim 1, further comprising:
cropping, by the processing unit [104], the region of interest from the captured second image via convolutional neural network-based object detector; and
aligning, by the processing unit [104], the region of interest to detect one or more text fields present on the image of the identification document.

9. The method of claim 8, wherein performing, by the second liveness checking unit [107], the liveness check of the identification document in the processed image of the second image, further comprises performing an ID liveness check on the aligned image of the identification document via the neural network-based liveness checking unit.

10. The method of claim 1, wherein performing the one or more ID quality checks further comprises performing, by the processing unit [104], at least one of a blur check, an exposure check, and a glare check on the region of interest of the identification document.

11. The method of claim 10, wherein to perform the glare check, the processing unit [104] is further configured to:
passing, the aligned image of the identification document via the convolutional neural network to detect at least one of an overexposed region and a region with patches of glare;
comparing, the detected at least one of the overexposed region and the region with patches of glare, with a template of the captured ID card to detect the region of glare.

12. The method of claim 1, wherein performing the one or more ID tampering checks further comprises performing, by the processing unit, at least one of a text tampering check, and a photo tampering check on the region of interest of the identification document.

13. The method of claim 1, wherein a neural network-based liveness checking unit is a pretrained classification model, and wherein the neural network-based liveness check module indicates whether the second image captured by the capturing unit [102] is one of live or non-live.

14. A system for authenticating identity of a user, the system comprising;
an image capturing unit [102] configured to capture one or more first image of a first human object and one or more second image of an identification document, wherein the identification document further comprises an image of a second human object;
a processing unit [104] configured to:
detect the face of the first human object in the captured first image based on a neural network-based rotation-invariant face detector;
drop, based on the detected first human object in the captured first image, at least one of a plurality of low-quality non-facial objects from the captured first image;
process the at least one face of the at least one first human object in the captured first image, wherein said process of the at least one face of the at least one first human object in the captured first image, further performs at least one of:
one or more face attribute checks on the at least one first human object to detect one or more obstructions on the first human object, one or more face quality checks on the at least one first human object using 256-dimensional face feature vector, and
one or more face manipulation checks on the at least one first human object to detect image manipulation;
detect the identification document in the captured second image;
drop, based on the captured second image in the identification document, at least one of a plurality of low-quality non-facial residual objects from the image of the identification document;
process, based on a location of a user, the identification document image from the second image to identify a region of interest in the identification document image;
crop the identified region of interest from the captured second image;
process the cropped region of interest of the extracted identification document image, wherein the step of said process further comprises:
perform one or more ID quality checks on the processed image of the second image;
perform one or more ID tampering checks on the processed image of the second image; and
perform one or more ID quality checks using 256-dimensional face feature vector;
generate a processed image of the identification document based on the processed region of interest; and
detect the face of the second human object in the captured second image;
a first liveness checking unit [106] configured to perform a liveness check of the at least one first human object in the captured first image, wherein the processing unit is further configured to:
determine an image face feature vector based on processing of the detected face of the at least one first human;
a second liveness checking unit [107] configured to perform a liveness check of the identification document in the processed image of the captured second image, wherein the processing unit [104] is further configured to:
determine an ID card face feature vector based on processing of the detected face of the at least one second human object;
wherein the processing unit [104] is further configured to:
determine a match score between the image face feature vector and the ID card face feature vector; and
determine a status indicating one of an authentication success, an authentication failure, and a requirement for manual review of the image, based on the match score, a threshold value and the performance of the liveness check of the at least one first human object in the captured image and the liveness check of the identification document in the processed image of the captured second image.

15. The system of claim 14, wherein the match score is determined based on a cosine distance between the image face feature vector and the ID card face feature vector.

16. The system of claim 14, wherein detecting, by the processing unit [104], the face of the at least one first human object in the captured first image is based on a detection technique, wherein the detection technique comprises: a face bounding box detection technique, a face fiducial point detection technique and a technique based on cropping and aligning a largest human face present in the captured first image.

17. The system of claim 14, wherein performing one or more face attributes checks further comprises performing, by the processing unit, at least one of a eyes closed check, a mask check, and a glasses check on the first image captured by the capturing unit [102].

18. The system of claim 14, wherein the one or more face quality check further comprises performing on the first image captured by the capturing unit [102] at least a blur check, an exposure check, and a brightness check.

19. The system of claim 14, wherein one or more face manipulation check further comprises performing on the first image captured by the capturing unit [102] at least a photoshop check and a deep fake check.

20. The system of claim 14, wherein performing, by the first liveness checking unit [106], the liveness check of the at least one first human object in the first image, further comprises processing the captured image of the at least one first human object by a neural network-based liveness check module, wherein the neural network-based liveness check module indicates if the first human object is one of live and non-live.

21. The system of claim 14, wherein processing, by the processing unit [104], the second image to generate an second image, further comprises:

detecting an ID card region of Interest;

cropping the region of interest from the identification document via convolutional neural network-based object detector; and aligning the region of interest to detect one or more text fields present on the image of the identification document.

22. The system of claim 21, wherein performing, by the second liveness checking unit [107], the liveness check of the identification document in the processed image of the captured second image, further comprises performing a ID liveness check on the aligned image of the identification document via the neural network-based liveness checking unit.

23. The system of claim 14, wherein one or more ID quality checks further comprises performing on the processed image of the captured second image at least a blur check, an exposure check, and a glare check.

24. The system of claim 23, wherein to perform the glare check, the processing unit [104] is further configured to:

pass, the aligned image of the identification document via the convolutional neural network to detect at least one of an overexposed region and a region with patches of glare;

compare, the detected at least one of the overexposed region and the region with patches of glare, with a template of the captured ID card to detect the region of glare.

25. The system of claim 23, wherein one or more ID tampering checks further comprises performing on the processed image of the captured second image at least a text tampering check, and a photo tampering check.

26. The system of claim 14, wherein a neural network-based liveness checking unit is a pretrained classification model, and wherein the neural network-based liveness check module indicates whether the second image captured by the capturing unit [102] is live or non-live.

27. A non-transitory computer readable medium configured to provide a system for authenticating identity of a user, wherein, when executed, the instructions cause a processor to perform the following:

capturing, by an image capturing unit [102], a first image comprising at least one first human object and a second image comprising at least one identification document, wherein the identification document further comprises an image of a second human object;

detecting, by a processing unit [104], at least one face of the at least one first human object in the captured first image based on a neural network-based rotation-invariant face detector;

based on the detected first human object in the captured first image, dropping at least one of a plurality of low-quality non-facial residual objects from the captured first image;

processing, by the processing unit [104], the at least one face of the at least one first human object in the captured first image, wherein processing the at least one face of the at least one first human object in the captured first image further comprises performing at least one of:

one or more face attribute checks on the at least one first human object in the first image to detect one or more obstructions on the first human object, one or more face quality checks on the at least one first human object in the first image using 256-dimensional face feature vector, and one or more face manipulation checks on the at least one first human object in the first image to detect image manipulation;

performing, by a liveness checking unit [106], a liveness check of the at least one first human object in the captured first image;

determining, by the processing unit [104], an image face feature vector based on the liveness check of the at least one first human object in the captured first image and the processing of the at least one face of the at least one first human object in the captured first image;

processing, by the processing unit [104], the captured second image to:

identify a region of interest of the identification document based on a location of a user; and crop the identified region of interest from the captured second image;

performing, by the liveness checking unit [106], a liveness check of the identification document in the second image;

processing, by the processing unit [104], the region of interest of the identification document to generate a processed image of the identification document image, wherein the step of said processing further comprises:

performing, by the processing unit [104], one or more ID quality checks on the region of interest of the identification document;

performing, by the processing unit [104], one or more ID tampering checks on the region of interest of the identification document; and performing, by the processing unit, one or more ID quality checks using 256-dimensional face feature vector;

detecting, by the processing unit [104], a face of the at least one second human object from the processed image of the identification document;

based on the detected second human object in the processed image of the identification document, dropping at least one of a plurality of low-quality non-facial residual objects from the image of the identification document;

determining, by the processing unit [104], an ID card face feature vector based on the processing of the region of interest of the identification document using a 256-dimensional face feature vector;

determining, by the processing unit [104], a match score between the image face feature vector and the ID card face feature vector; and determining, by the processing unit [104], a status indicating one of an authentication success, an authentication failure, and a requirement for manual review of the image, based on the match score, a threshold value and the performance of the liveness check of the at least one first human object in the captured first image and the liveness check of the identification document in the captured second image.

\* \* \* \* \*